United States Patent
Sarris et al.

[11] Patent Number: 5,508,494
[45] Date of Patent: Apr. 16, 1996

[54] PORTABLE CUP FOR WARMING BEVERAGES

[76] Inventors: Louis L. Sarris; Ann J. Sarris, both of 3570 Summer Hill Dr., Salt Lake City, Utah 84121

[21] Appl. No.: 339,944

[22] Filed: Nov. 15, 1994

[51] Int. Cl.⁶ .................................................. H05B 3/80
[52] U.S. Cl. ........................ 219/386; 219/385; 219/437
[58] Field of Search ................................. 219/385, 386, 219/387, 436, 437, 438, 521

[56] References Cited

U.S. PATENT DOCUMENTS

| | | |
|---|---|---|
| 1,817,090 | 8/1931 | McGowen et al. |
| 3,423,571 | 1/1969 | Trachtenberg et al. ............... 219/441 |
| 3,549,861 | 4/1969 | Trachentberg et al. ............... 219/441 |
| 3,914,576 | 10/1975 | Ciaffone ............................... 219/214 |
| 4,095,090 | 6/1978 | Pianezza .............................. 219/441 |
| 4,238,666 | 12/1980 | Pomper ............................... 219/318 |
| 4,439,668 | 3/1984 | Wells .................................. 219/438 |
| 4,463,664 | 8/1984 | Peace .................................. 99/323.3 |
| 4,730,099 | 3/1988 | Bleckman ............................ 219/328 |
| 5,058,195 | 10/1991 | Knepler ............................... 392/442 |
| 5,243,684 | 9/1993 | Edwards ............................. 392/444 |
| 5,377,299 | 12/1994 | Anson et al. ........................ 392/447 |

*Primary Examiner*—Teresa J. Walberg
*Assistant Examiner*—J. Pelham
*Attorney, Agent, or Firm*—James L. Sonntag

[57] ABSTRACT

Disclosed is a beverage cup for warming beverages that is made of thermally and electrically insulating material, such as injection molded low-melting point plastic, and has an integral heater element that warms the beverage. Also disclosed is a system for retracting the power cord of the cup.

9 Claims, 4 Drawing Sheets

PORTABLE CUP FOR WARMING BEVERAGES

FIELD OF THE INVENTION

This invention relates to a beverage container for heating and maintaining the warmth of beverages.

BACKGROUND OF THE INVENTION

The drinking of beverages is an activity that frequently accompanies driving. Cup holders, insulated cola cups, and various non-spill cups have accordingly become a fixture in many motor vehicles. Among some drivers, heated beverages such as coffee or tea are favored. Insulated cups can be used to keep the beverage warm, but for long drives, such in long-haul trucking, the beverage will not stay warm over the duration of the drive. Various heated cups and cup warmers are available that plug into the cigarette lighter outlet, but many are inconvenient or unsafe to use. For example, the commonly used beverage heaters that are placed into the top opening of the cup will heat the beverage, but are inconvenient and hazardous. The heating surfaces are exposed, which presents the possibility of burning the user, melting the cup. In addition, in order to drink, the heater must be removed, which presents the dilemma of where to put the hot heating element without burning or damaging the user, the cup, upholstery, or etc.

Many non-heated insulated cups used currently by drivers are injection molded from low melting point polymers (polyethylene, polypropylene, or the like) and contact with any heating device will damage the cup. Thus, heating beverages in this popular cup with the currently available heaters is not possible or is impractical.

Heating plates and heating cups have been developed, but most of these suffer from one or more problems. These problems include (1) a hot surface of the heating element is exposed and it may be contacted by clothing, upholstery, or the user; (2) the cup or heating system is mechanically too complicated, increasing material and manufacturing costs so that it is not commercially viable; (3) operation of the heating system and cup requires undue attention from the driver, so is an unsafe distraction from driving; and (4) the heating system frequently has a long ungainly cord that can pull the cup over. In addition, for many beverage heaters, because the container itself is hot or because of the mechanical configuration of the container, the user cannot drink directly from the container. Thus, it is necessary to pour the beverage into a cup for drinking. However, once the beverage is in the new cup, it begins to cool and the warmth is not maintained over an extended period.

OBJECTS OF THE INVENTION

It is, therefore, an object of the invention to provide a cup for warming and maintaining the warmth of beverages that is simple and safe to use.

Another object of the invention is to provide a cup for warming beverages that has no exposed hot surfaces which may contact something that may be damaged by the heat, upholstery, a person's flesh, or clothing.

Another object of the invention is to provide a cup for warming beverages that enables one to drink the heated beverage without having to pour it into another container.

Another object of the invention is to provide a warming cup that is mechanically uncomplicated and relatively inexpensive to manufacture.

Further objects of the invention will become evident in the description below.

SUMMARY OF THE INVENTION

The present invention is a heating cup that contains an integral heater for heating maintaining the warmth of a beverage. The heater is disposed and constructed such that there are no exposed hot surfaces, such that the heater is electrically and thermally isolated. The cup itself is similar to the insulated injection molded plastic cups currently in use. Thus, the portions which are handled or touched by the user, e.g., the outside surfaces, the handle, the drinking lip, are all thermally and electrically insulated. Thus, there is no danger of the user being burned or subjected to electrical shock from touching a heating element or exposed metallic surface. The possibility of a user being subjected to electrical shock while drinking or handling the cup is virtually eliminated. In addition, the cup can be held and used while the heater is in use. Accordingly, it is not necessary to remove and attend to a hot heating element, and it is not necessary to pour the heated beverage into another container to drink it.

Also provided with the heating cup is a control system to turn off the heater when the contents of the cup reach a predetermined temperature in order to prevent overheating and boiling of the beverage. If the cup is empty or the beverage evaporates dry, the control system will still prevent the heater from damaging the cup to the extent that its function is compromised. Thus, there is little danger that an unattended cup will accidentally start a fire, damage upholstery, or otherwise become an electrical or fire hazard.

Since the body of the cup can be made of commonly used plastic material by injection molding, in the same manner as the insulated cups currently in use, the cups can be made less expensively than prior-an heated cups of a special and mechanically more complex construction. The configuration of the cup of the invention is such that inexpensive injection molding polymers can be used, while still incorporating a heating element.

Since the heater is integrated into the cup and isolated from direct handling by the user, it is possible to incorporate a higher capacity heating means that will quickly heat the beverage. For example, for the embodiment described below and illustrated in the figures, an ounce of beverage can be heated at a rate of about an ounce a minute.

An embodiment of the invention is a beverage cup that comprises;

(a) a container having a bottom wall, and a side wall extending upwards from the bottom wall to form an interior with an open top for containing a beverage, (b) an outer shell having a bottom wall, and a side wall extending upwards from the bottom wall to a cup-like shell with an open top that generally corresponds to the shape of and is concentric to the container with an attachment of the outer shell and the container at the peripheries of their respective open tops such that there is a thermally insulating air gap between an outer surface of the container and an inner surface of the outer shell, the container and the outer shell constructed of a thermoplastic material that is thermally and electrically insulating and has softening point above the boiling point of water, (c) a heater bar with an electrical resistance heating means, the heater bar extending from an outer surface of the container side wall of the container through a first aperture in the container wall, through the interior of the container, and through a second aperture in the container side wall to an outer surface of the container side wall, the heater bar disposed such that it passes through a portion of the interior that is normally submerged when beverage is in the container, (d) a first bushing surrounding the portion of the heater bar passing through the first aperture, (e) a second bushing surrounding the portion of the heater bar passing through the second aperture, the first and second bushings constructed and arranged to provide a liquid seal between the heater bar and the edges of the first and second apertures, respectively, the first and second bushing providing a thermal insulation between the heater bar and the material of the container to prevent the material of the container from softening and deforming from heat generated by the heating means, (f) a heat sensor contained in the wall of the container at a point such that the point is normally submerged when beverage is in the container, the heat sensor controlling a switch means that is in a default closed state to direct current to the heater means, but is opened when the temperature at the heat sensor is at or exceeds a predetermined temperature, the heat sensor disposed sufficiently proximate to the heater bar such that when the sensor and heater bar are not submerged in beverage heat generated by the heating bar will activate the sensor to close the switch means, and (g) a power cord with a first end extending to an electrical connection with the heating means and the sensor, and with a second end including a plug means for electrical connection to a power source to form an electrical supply circuit for the heater means.

Preferably the container and the outer shell are of a generally cylindrical configuration around an axis at the center of the cup. The cup of the invention may also incorporate a cord wind-up system that allows one to extend and retract the cord to a predetermined length. In this embodiment, the cup additionally comprises;

(h) a pivot on the center axis of the cup that permits the container to be rotated on the axis with respect to the outer shell, and (i) a boss on the container to which the second end of the power cord is physically attached,
wherein the second end of the power cord passes through an aperture in the outer shell before its physical connection to the boss, such that by rotation of the container relative to the shell, the power cord can be pulled through the aperture in the shell and wound around the outer surface of the container in a helical manner.

DETAILED DESCRIPTION OF THE INVENTION

Figure 1:
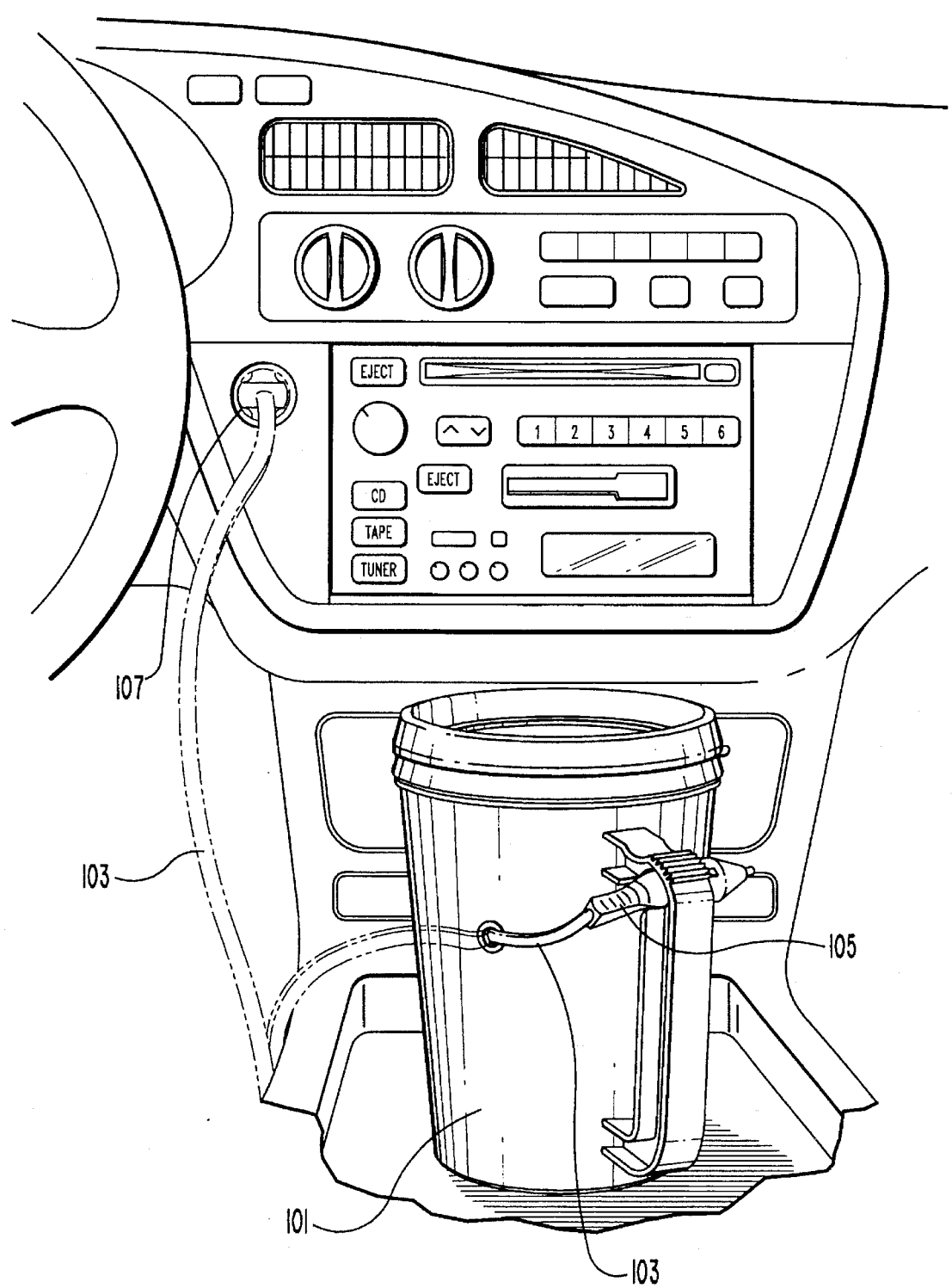
FIG. 1 is a perspective view of a beverage cup of the invention as used in an automobile.

Referring to FIG. 1, the preferred use for the cup of the invention is in motor vehicles equipped with a conventional cigarette-lighter-12V electrical outlet. Shown is a cup of the invention 101. A power cord 103 with a suitable plug 105 can be retracted (as shown) or the cord 103 may be extended and the plug 105 inserted in the outlet 107 (as shown by the cord in phantom). The retraction and extension of the cord is more fully described below.

Figure 2:
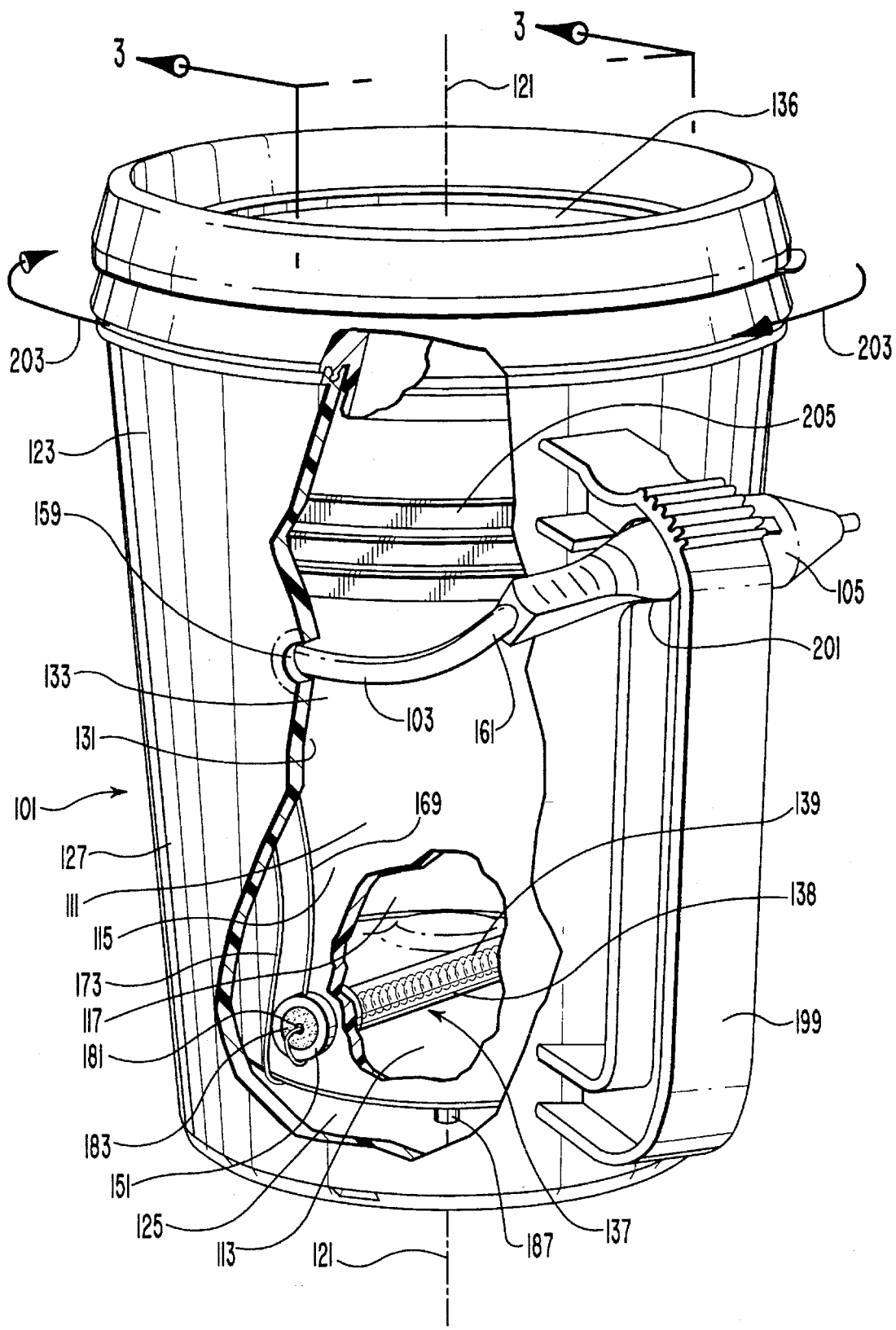
FIG. 2 is a perspective view of a beverage cup of the invention in partial cutaway.
Figure 3:
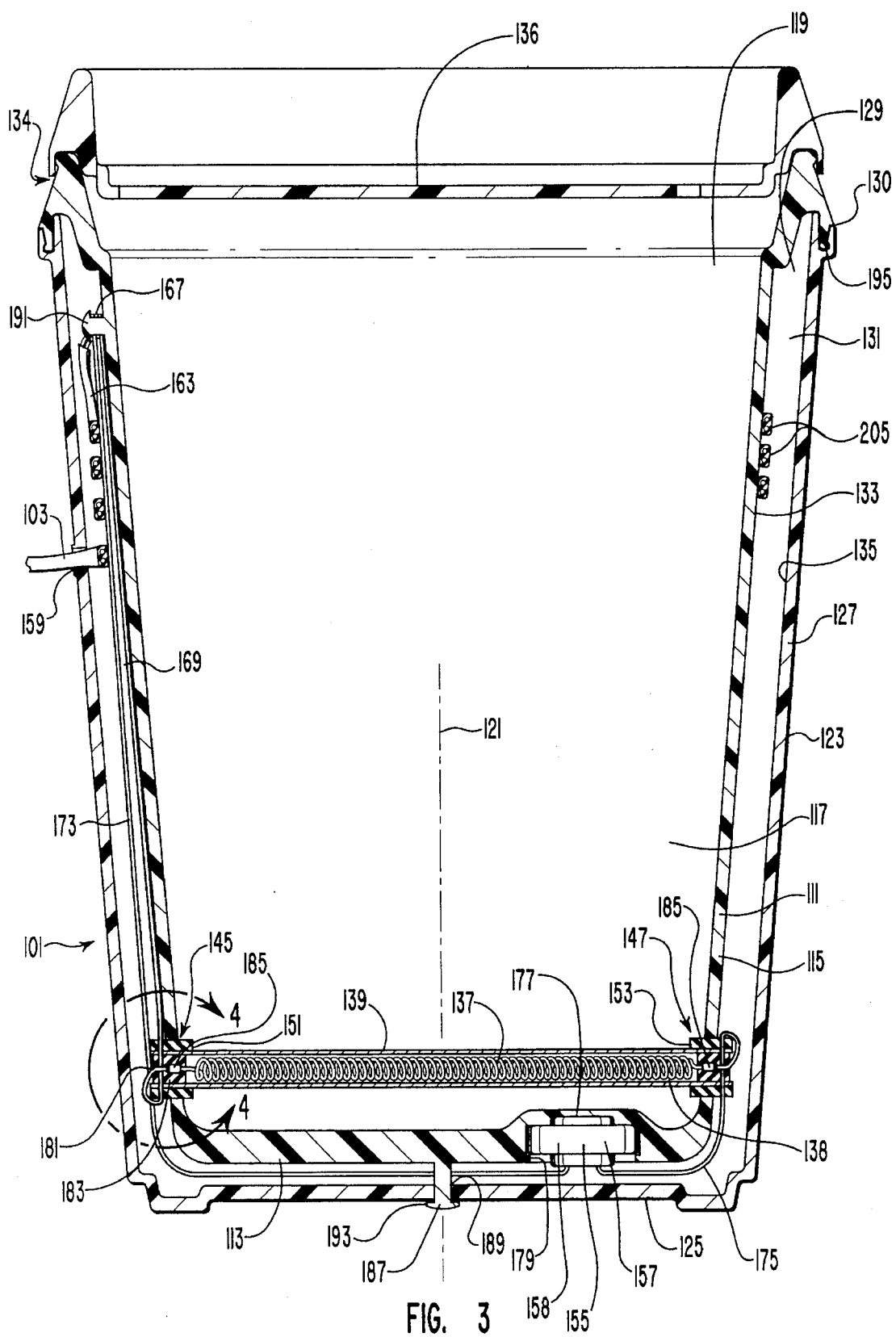
FIG. 3 is a cross-section of the beverage cup through 3 in FIG. 2.

Referring to FIGS. 2 and 3, the cup of the invention 101 comprises a container 111 having a bottom wall 113, and a side wall 115 extending upwards from the bottom wall 113 to form a interior 117 for a beverage having an open top 119. Preferably the side wall 115 is generally cylindrical or tube-like in form with center axis 121 through the center oft he cup 101. An outer shell 123 having a bottom wall 125, and a side wall 127 extending upwards from the bottom wall 125 with an open top 129. The outer shell 123 generally corresponds to the shape of and is concentric to the container 111. The outer shell 123 and the container 111 are attached at an attachment 130 at or near their open tops 119,129 with a thermally insulating air gap 131 between an outer surface 133 of the container and an inner surface 135 of the outer shell 123. The attachment 130 near the peripheries of the openings is constructed to provide a liquid seal against beverage and wash water from entering into the air gap 131. Preferably, the cup 101 includes a lid 136 that fits over the opening 119 of the container 111. The lid 136 is preferably tight fitting in the opening 119 or the lid has a snap or locking flange 134 to hold the lid 136 in place.

The container and shell are preferably generally cylindrical or tube-like about a center axis, i.e., having a circular cross-section. However, non-circular cross-sections are contemplated. Both the container and the shell are constructed of a thermoplastic material with a softening point above the boiling point of water to withstand the temperature of a hot beverage, to prevent softening and deformation of the cup. In addition, the container and the shell are of a material that is thermally and electrically insulating. Any suitable material is contemplated, but the preferred materials are low melting thermoplastic polymers conventionally used in injection molded insulated cups, such as polyethylene and polypropylene. The gap between the container and the outer shell is any suitable dimension, but is preferably dimensioned to provide an insulative air-gap. The air gap may also be filled with any suitable material for insulation and the like, such as insulative foam.

The cup 101 additionally comprises a heater bar 138 with an electrical resistance heating means 137. In the illustrated embodiment, the heater bar 138 comprises a metallic tube 139 of a noncorrosive metal, such as stainless steel or aluminum with a nickel-chromium (Nichrome™) wire coil passing through the interior of the tube to provide the heating means 137. To prevent the coiled Nichrome wire from shorting on the tube, it is preferably insulated with a suitable temperature resistant electrical insulator. The gauge and length of the Nichrome wire is adapted to the voltage of the power source and heating capacity of the heater means. For example, a suitable heating element comprises 25 gauge Nichrome wire insulated with fiberglass (triple glass wrap with a two pass binder).

In an alternate system, the heater bar 138 may comprise a solid heating element of a metal such as Nichrome or of an electrical conducting polymeric material that has electrical resistance so as to function as a heater. However, this arrangement is not preferred as it exposes electrically conducting elements to the beverage. The advantage of the system illustrated in the figures and described above, is that the elements in the cup that conduct electricity are isolated from the beverage. This eliminates the possibility of the user being grounded and receiving a shock while drinking from the cup.

The heater bar 138 extends through the interior 117 where the beverage is contained in order to heat beverage therein. More specifically, it extends from the outer surface 133 of the side wall 115 of the container 111 through a first aperture 145 in the container side wall 115, through the interior 117 of the container 111, and through a second container aperture 147 in the container side wall to the outer surface 133 of the container side wall 115 at a point opposite the original point of entry. The location where the heater bar 138 passes through the interior at a location where at least a portion of the heater bar is normally submerged by beverage, typically near the bottom wall of the container. The heater bar 138 preferably passes horizontally through the axis 121 of the interior 117, i.e., along a diameter of the interior of the interior. The heater bar 138 must be spaced sufficiently from the container bottom and side walls 113,115 to prevent the heat from the heater bar 138 from softening the thermoplastic material of the walls.

First and second bushings 151,153 surround the portion of the heater bar 138 that passes through the first and second apertures, 145, 147 respectively. The bushings 151, 153 provide a liquid seal between the edges of the first and second apertures and the heater bar, and also isolate the material of the container from the heater bar to prevent heat damage to the container material. The bushing material is of a heat resistant, thermally insulating material. Suitable materials include any of the known heat resistant thermoplastic or thermoset materials, such as a fluoropolymers (Teflon™).

A heat sensor 155 is imbedded or contained in the wall (113 or 115) of the container 111. It is disposed such that it is protected from the liquid beverage and in a position where it will normally measure temperature from a submerged portion in the interior 117 when beverage is in the container 111. Preferably the position is in the bottom wall 113 of the container 111. The thickness of the wall material between the inside of the interior and the sensor is sufficient to protect the sensor from hot beverage and thin enough to activate the sensor when the beverage is at or above a predetermined temperature. When beverage in the container is at or above a predetermined temperature the sensor 155 activates a switch means 157 opens the electrical supply circuit to the heating means 137. The sensor 155 and switching means 157 may be separate or their functions are preferably combined into an integrated unit, such as a bimetallic reed switch or a thermistor. Illustrated in FIG. 3 is the most preferred embodiment, which is a thermistor 158. Suitable thermistors are those commercially available. Preferably the thermistor is set to switch off at about 140° to 150° F., and set to switch on 5° to 20° F. below the switch on temperature.

The heat sensor 155 is placed proximate to the heater bar 138, such that when there is no beverage covering the heater bar 138, the heat radiated from the heater bar will activate the heat sensor 155 to open the supply circuit. It is not desirable to provide a heat conducting strip of metal between the heater bar 138 and the sensor 155, as this causes the sensor to react directly to the temperature of the heater bar and not the temperature of the beverage. The result is premature activation of the switching means at a low temperature and inadequate heating of the beverage. It has been found the placement of a thermistor on the bottom of the container, with the heater bar passing above or near the thermistor was sufficient to prevent the heater bar from destroying or melting the container when no beverage is in the container. After a test over several hours of a dry container that was left plugged in, the polyethylene container was distorted from the heat, but not enough to destroy the integrity of the liquid seal of the container at the heater bar ends. Thus, the cup was still fully functional. Even when the cup of the invention is neglected, there is not the possibility of a fire, melting of the cup, or exposure of electrical or heating elements.

Figure 5:
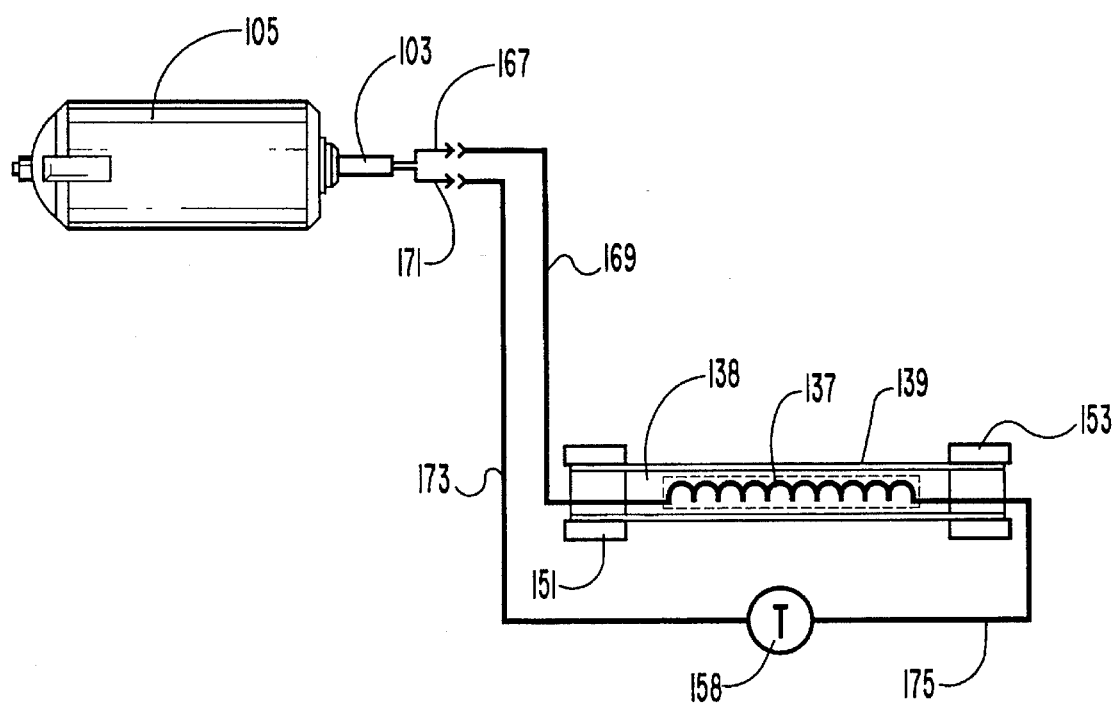
FIG. 5 is a circuit diagram of the power supply circuit with the heating means and thermistor of a beverage cup of the invention.

Electrical current is supplied by means of a two conductor power cord 103. A first end 161 of the cord 103 extends through an aperture 159 in the outer shell and is electrically connected to the heating means 137. At a second end 163 is a plug means 105 for electrical connection to a power source (not shown). Preferably, the power source is the 12V system of a motor vehicle and the plug means is adapted to connect to the cigarette lighter socket as illustrated in FIG. 1. The power cord 103 is thereby connected in an electrical supply circuit for directing electrical current to the heater means 137. Referring to FIGS. 3 and 5, a plug means 105 is connected to the power cord 103. The first lead 167 of the power cord is connected by a lead 169 to the heating means 137 within the heater bar 138. The second lead 171 or the power cord 103 through a lead 173 to a thermistor 158, which functions as both the heat sensor and switch means 155, 157. The thermistor 158 and the heater means 137 are then connected by a lead 175 in series circuit as shown. The switch means 157 is normally closed and is switched to an open state when a predetermined temperature is reached or exceeded as described above.

Referring to FIG. 3, the thermistor 158 is imbedded in the container wall by providing a cavity 177 in the outside surface of the container bottom wall 113. The cavity 177 is sized to receive the thermistor and includes a small locking flange 179 so that the thermistor is snapped into the cavity and held therein by the flange. The electrical leads 173, 175 to the thermistor are then brought through the cavity opening. Alternately the thermistor may be secured by a cover over the cavity opening. The cover may be of the same thermoplastic as the container and secured by welding the cover to the container.

Figure 4:
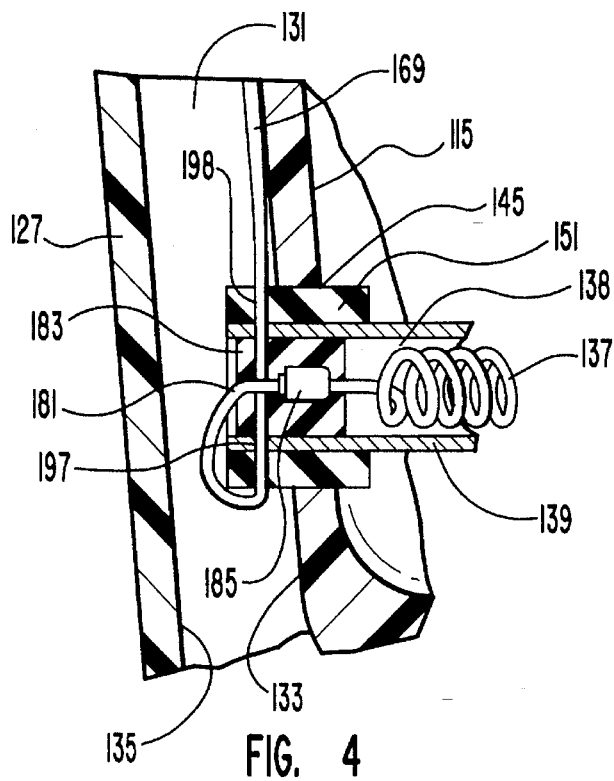
FIG. 4 is a detail view of the end of the heater bar at 4 in FIG. 3.

Referring to FIG. 4, which is a detail of the heating means connection in FIG. 3, the lead 169 from its connection with the first lead 167 of the power cord 103 is passed down through an aperture 197 in the first bushing 151 and the tube 139 and around the first bushing 151 wherein it extends from the first aperture 145. The lead 169 may be wrapped several times around the bushing to physically secure it. The lead 167 is also passed through the aperture 197 in the tube 139, and aperture 198 in the bushings 151, 153. For the tube 139, this assists in securing the tube 139 in the cup and prevents the tube from sliding through the bushing 151. It also prevents the bushings 151, 153 from sliding through the aperture 145, 147 in the container 111. The lead 169 is then passed through an aperture 181 in a tube cap 183 placed in the end of the tube 139 of the heating bar in order to secure the lead 169 and the coiled resistance wire of the heating means 137. The leads are of any suitable construction; 25 gauge copper wire insulated with an enamel resistance coating has been found suitable. The resistance coating should be able to withstand the heat from the heating means 137.

The heating means, in the form of a Nichrome resistance wire is connected to leads 169, 175 by sleeve-type wire connectors 185. The connectors are then insulated with a fiberglass sleeve to prevent an electrical short on the heater tube 139. Silicone adhesive is placed around the ends of the heater bar to seal any beverage leaks, to seal the heating means 137 from moisture, and help secure the heater bar 138 in place. The tube caps 183 are also made of the same silicone, which is squirted into the ends of the tube 139, and imbeds the connectors 185. To get the silicone to adhere to the polypropylene or polyethylene material of the container, a primer is used. The silicone and the primer are FDA approved. Silicone adhesive is not preferred for the insulator for the wire connectors 185, as its pour point is about 360° F., which is 40° to 50° F. below the temperature to which the Nichrome heating means 137 is heated.

Referring to FIGS. 2 and 3, in the illustrated embodiment the power cord 103 may be retracted or extended. A pivot 187 or axle is disposed on and extends downwards from the outer surface 190 of bottom wall 113 of the container 111 at the center axis 121. The axis 121 passes through a pivot aperture 189 in the bottom wall 125 of the shell, which is configured to receive the pivot 187. The attachment 130 of the outer shell and the container is not fixed but is slidable, allowing the container 111 to be rotated within the shell 123 around the axis 121 on the pivot 187. The power cord 103 passes through the power cord aperture 159 in the side wall of the outer shell and is attached at its second end 163 to a boss 191 where it is fixed to the container 111. At the boss, the power cord leads 167, 171 are electrically connected to leads 169, 173. When the container 111 is rotated, the power cord 103 is wound around the outer surface 133 of the container side wall 115. The aperture 159 for the power cord is placed lower than the boss 191, such that when the cord 103 is wound around the container, the helical coils 205 of the wound power cord are between the boss 191 and aperture 159. Placement of the boss 191 below the power cord aperture 159 is not preferred, as this configuration results in frequent jamming of the cord and uneven winding.

The outer surface of the container side wall 133 may be optionally provided with grooves, or the like, to assist in the winding of the cord. In addition, other means may be provided to allow such rotation of the container within the outer shell, such as sliding tracks on the bottom walls and/or side walls of the container and shell. In the illustrated embodiment, the axle has a locking flange 193 to secure the shell and container together. However, the axle may also be, for example, in the form of a mere dimple, and a locking flange be provided at the attachment near the openings of the container and the shell, or a locking flange be provided at only the attachment near the peripheries of the container and shell openings. In FIG. 3 is a small locking flange 195 at the attachment 130 of the container and the outer shell is provided.

The container may be rotated relative to the shell (as shown be arrows 203 in FIG. 2) by holding the outer shell in one hand and turning the top of the container with the other, the cord is thereby wound around the container wall in the insulating space between the container walls and the shell walls, as described. The cord may be thus wound several times to retract a moderately long cord. To unwind or extend the cord, the cup is held by the outer shell in one hand and the cord pulled by the other. The container then is forced to rotate as the cord is pulled off from the container wall.

Once the power cord 103 is retracted, it is preferred to provide any suitable means for securing the plug 105 to the cup. Illustrated in FIG. 2, is one such means, a plug receptacle 201 is provided on the handle 199 of the cup, which is constructed to receive and secure the plug. Thus, the plug 105 can be snapped into the receptacle and secured.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A beverage cup comprising;
    (a) a container having a bottom wall, and a side wall extending upwards from the bottom wall to form an interior with an open top for containing a beverage,
    (b) an outer shell having a bottom wall, and a side wall extending upwards from the bottom wall to a cup-like shell with an open top that generally corresponds to the shape of and is concentric to the container with an attachment of the outer shell and the container at the peripheries of their respective open tops such that there is a thermally insulating air gap between an outer surface of the container and an inner surface of the outer shell, the container and the outer shell constructed of a low melting temperature thermoplastic polymer material that is thermally and electrically insulating, and that is subject to heat damage if contacted with the heater bar when the heater bar is in a heated condition,
    (c) a heater bar with an electrical resistance heating means, the heater bar extending from an outer surface of the container side wall of the container through a first aperture in the container wall, through the interior of the container, and through a second aperture in the container side wall to an outer surface of the container side wall, the heater bar disposed such that it passes through a portion of the interior at a location where it can be submerged by beverage in the container,
    (d) a first bushing surrounding the portion of the heater bar passing through the first
    (e) a second bushing surrounding the portion of the hater bar passing through the second aperture, the first and second bushings constructed and arranged to provide a liquid seal between the heater bar and the edges of the first and second apertures, respectively, the first and second bushing providing a thermal insulation between the heater bar and the material of the container to prevent the material of the container from softening and deforming from heat generated by the heating means,
    (f) a heat sensor contained in the wall of the container at a point such that the point is normally submerged when beverage is in the container, the heat sensor controlling a switch means that is in a default closed state to direct current to the heater means, but is opened when the temperature at the heat sensor is at or exceeds a predetermined temperature, the heat sensor disposed sufficiently proximate to the heater bar such that when the sensor and heater bar are not submerged in beverage heat generated by the heating bar will activate the sensor to open the switch means, and
    (g) a power cord with a first end extending to an electrical connection with the heating means and the sensor, and with a second end including a plug means for electrical connection to a power source to form an electrical supply circuit for the heater means.

2. The cup of claim 1 wherein the container and the outer shell are of a generally cylindrical configuration around an axis at the center of the cup.

3. The cup of claim 2 additionally comprising;
    (g) a pivot on the center axis of the cup permits the container to be rotated on the axis with respect to the outer shell, and (h) a boss on the container to which the second end of the power cord is physically attached, wherein the second end of the power cord passes through an aperture in the outer shell before its physical connection to the boss, such that by rotation of the container relative to the shell, the power cord can be pulled through the aperture in the shell and wound around the outer surface of the container.

4. The cup of claim 1 wherein the material of the outers shell and the container is a thermoplastic that has a softening point above the boiling point of water.

5. The cup of claim 1 wherein the plastic material is chosen from the group consisting of polyethylene and polypropylene.

6. The cup of claim 1 wherein the heater bar comprises a straight metallic tube and the electrical resistance heating means is a wire coil passing through the interior or the tube, the wire coil electrically insulated from the metallic tube.

7. A beverage cup comprising;

(a) a container for containing a beverage, (b) the heater bar when the heater bar is in a heater condition with an electrical resistance heating means, the heater bar extending through walls of the container such that it passes through a portion of the container at a location where it can be submerged by beverage in the container, the container constructed of a polyethylene or polypropylene material that is damaged if contacted with a hot heater bar, the heater bar thermally insulated in a liquid sealable manner from the material of the container where the heater bar passes through the container walls to prevent the material of the container from being damaged from heat generated by the heating means and to prevent liquid from leaking from the container, (c) a means for electrical connection to an electrical power source to provide an electrical supply for the heater means, and (d) a means including a heat sensor that controls a switching means for the electrical resistance means to open the electrical connection means to the electrical resistance means when the sensor is heated to a predetermined temperature, the heat sensor contained in a wall of the container at a point submerged when beverage is in the container and proximate to the heater bar such that when no beverage is covering the heater bar radiant heat from the heater bar activates the sensor to open the electrical connection means.

8. The cup of claim 7 wherein the heater bar comprises a straight metallic tube and the electrical resistance heating means is a wire coil passing through the interior or the tube, the wire coil being electrically insulated from the metallic tube.

9. The cup of claim 7 wherein the heat sensor is set to open the circuit between a switch-on temperature between about 140° F. and 150° F. and close the circuit between about 5° F. and 20° F. below the switch-on temperature.

* * * * *